Dec. 19, 1950 C. E. CLEETON 2,534,233
ELECTRONIC TRIGGER AND SWITCH CIRCUITS
Original Filed Jan. 24, 1940 2 Sheets-Sheet 2
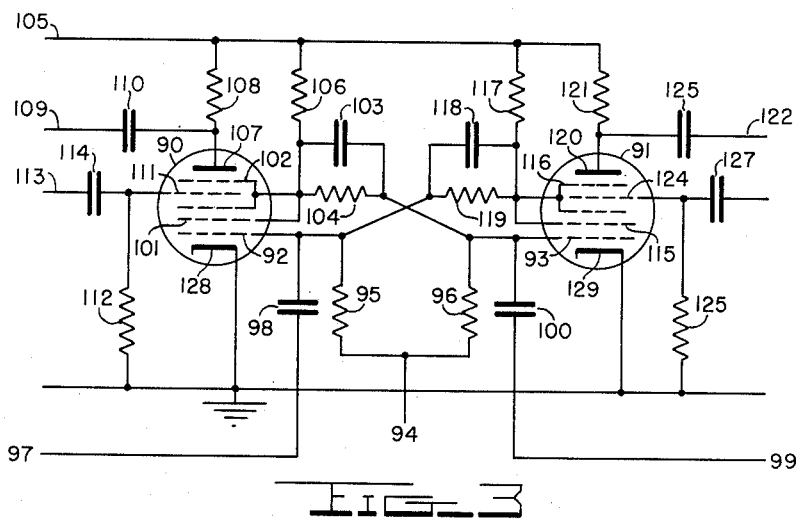
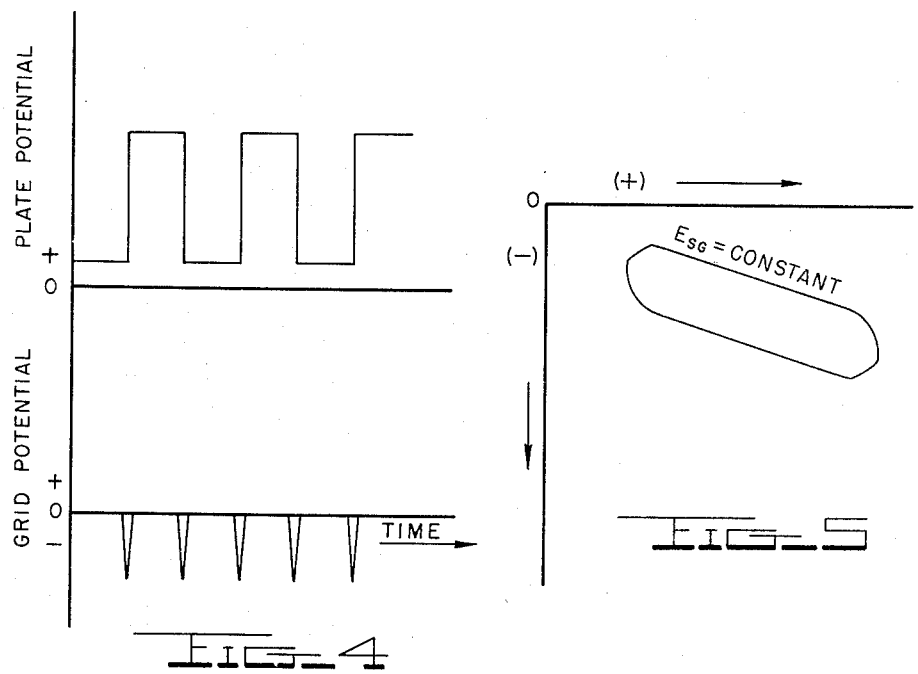
INVENTOR.
CLAUD E. CLEETON
BY *M. Hayes*
ATTORNEY Patented Dec. 19, 1950

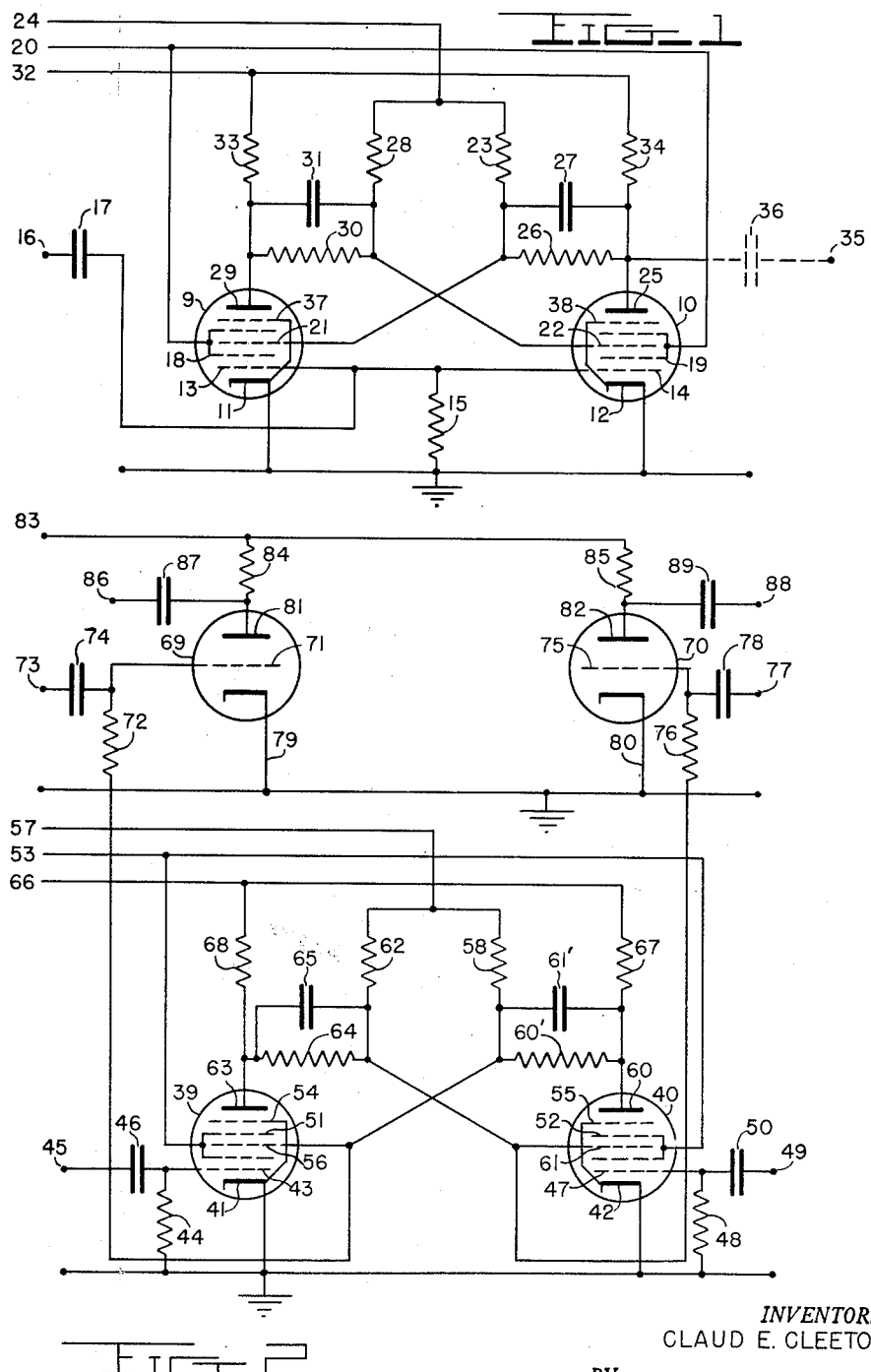

2,534,233

UNITED STATES PATENT OFFICE 2,534,233

ELECTRONIC TRIGGER AND SWITCH CIRCUITS

Claud E. Cleeton, Washington, D. C.

Original application January 24, 1940, Serial No. 315,340. Divided and this application August 13, 1948, Serial No. 44,211

8 Claims. (Cl. 250—27)

(Granted under the act of March 3, 1883, as amended April 30, 1928; 370 O. G. 757)

My invention relates generally to switching devices utilizing vacuum tubes, and particularly to such devices having trigger circuits for setting them into operation. It also relates generally to electronic devices for controlling associated circuits, and in particular to self-locking electronic relays, electronic counters, pulse expanders and square wave generators, and is a division of my application Serial No. 315,340, filed January 24, 1940. My invention will be described in connection with the following drawings, in which, Fig. 1 shows schematically the basic circuit of my invention, including the electronic trigger circuit;

Fig. 2 is a schematic diagram of the trigger circuit adapted to serve as an electronic self-locking relay with electrical reset, in which an electromechanical relay may be controlled or a two circuit amplifier may be switched;

Fig. 3 is a schematic diagram using one pair of tubes in a two circuit amplifier switching circuit;

Fig. 4 shows a pair of curves indicating the relation between the grid potential applied to a trigger circuit and the resulting plate potential; and Fig. 5 is the typical working diagram for the trigger circuit.

Referring to Fig. 1, two multi-grid tubes 9, 10, such as the well known pentagrid mixer or converter types, are connected in the basic circuit of my invention. The cathodes 11, 12 of both tubes are connected to ground. Grids 13 and 14 are grounded through grid leak 15, and both connect to terminal 16 through capacitor 17. The screen grids 18, 19 of both tubes are connected to the positive terminal 20 of a screen grid supply source. Grids 21 and 22 are shielded by screen grids 18 and 19 respectively. Grid 21 of tube 9 is connected to the negative terminal 24 of the direct potential grid supply source through grid resistance 23 and is also connected to the anode 25 of the opposite tube 10 through a circuit comprising resistance 26 and capacitance 27 in parallel. Grid 22 of tube 10 is connected to terminal 24 through grid resistance 28 and is also connected to the anode 29 of the opposite tube 9 through a circuit comprising resistance 30 and capacitance 31 in parallel. Both anodes 25 and 29 are connected to the positive terminal 32 of an anode direct potential supply source, anode 25 through resistance 34 and anode 29 through anode resistance 33. Terminal 35 is connected to anode 25 of tube 10 through capacitance 36. Grid 37 of tube 9 and grid 38 of tube 10 are shown internally connected to cathodes of their respective tubes.

The negative terminals of both the screen grid and the anode supply sources are connected to ground, as is the positive terminal of the grid supply source. Obviously, the same source may be employed to energize the entire circuit shown provided proper polarities are observed and appropriate voltage employed. The negative potential applied to grids 21, 22 by the source connected to terminal 24 is of such value that, if it were the only voltage applied to these grids, each tube would be biased considerably past cutoff. However, it will be noted that, in addition to the aforementioned negative potential, a positive potential is applied to each grid 21, 22 from the anode of the opposite tube. This positive potential varies in value depending upon the conductivity state of such opposite tube, i. e., when no anode current flows in tube 9, the positive potential applied to grid 22 of tube 10 from the anode 29 of tube 9 is of such value that the resultant potential of grid 22 is approximately zero. Similarly, when no anode current flows in tube 10, the resultant potential of grid 21 of tube 9 is approximately zero.

With the cathodes of tubes 9 and 10 heated in a conventional manner, when the supply voltages are applied to terminals 20, 24 and 32, shock excitation causes anode current to flow in one of tubes 9, 10, say tube 9. Due to the small circuit unbalance inevitably present, anode current does not begin to flow in both tubes simultaneously. This flow of anode current in tube 9 causes a voltage drop in anode resistance 33 with consequent reduction in the positive potential at anode 29 of tube 9 and at grid 22 of tube 10. The result of this reduction in the positive potential applied to grid 22 is that grid 22 becomes negative and anode current is prevented from flowing in tube 10. With no anode current flowing in tube 10, there is applied to anode 25 almost the full potential of terminal 32 and a correspondingly high positive potential is applied to grid 21 of tube 9, such that the resultant voltage of grid 21 is approximately zero, and anode current continues to flow in tube 9.

If now a negative pulse is applied to grids 13 and 14 through capacitance 17, the anode current of tube 9 will be reduced. This reduction in the anode current of tube 9 results in a smaller potential drop in anode resistance 33 and also in an increased positive potential being applied to anode 29. This increase in the potential of anode 29 causes a positive pulse to be transferred to grid 22 through capacitance 31 which causes anode current to begin to flow in tube 10. This flow of anode current through anode resistance 34 causes the potential of anode 25 to be reduced due to the potential drop in this resistance. This reduction of anode potential, in turn, causes a negative pulse to be applied to grid 21 of tube 9 through capacitance 27, producing a further reduction in the anode current of tube 9. This amplification process will be repeated until the anode current of tube 9 is completely cut off, with tube 10 conductive. The next succeeding incoming negative pulse will again reverse the conductivity state of the tubes, and thus restore the circuit to its original condition, i. e., with tube 9 conductive and tube 10 non-conductive.

It will be noted that there are only two stable states of anode current in the above circuit, that is, anode current flowing in one tube and zero in the other, and vice versa. When tube 9 or 10 is non-conductive the value of the resultant voltage applied to their respective grids 21, 22 is such as to prevent plate current from beginning to flow in the non-conductive tube when a positive pulse is applied to grid 13 or 14, as the case may be. A positive pulse applied to grid 13 or 14 of the conductive tube will obviously cause no change-over or reversal of the conductive state of the tubes. Thus, it is only when a negative pulse is applied to grid 13 or 14 of the conductive tube that the reversal occurs.

The circuit including capacitance 36 and terminal 35 may be utilized to couple to an external circuit the voltage variation of anode 25 of tube 10.

The circuit as well as the tubes of Fig. 1 are said to be "triggered" when negative pulses applied thereto cause a reversal in the conductive state of the tubes. The tubes and circuit are "triggered" by applying the negative pulses to grids 13 and 14, each such grid being a part of what is, in effect, a triode, the elements of one such triode being grid 13, cathode 11 and screen grid 18; the elements of the other triode being grid 14, cathode 12 and screen grid 19. Tubes 9 and 10 are coupled through circuit means including the anodes thereof and grids 21 and 22.

Used as an electronic relay, the apparatus of Fig. 1 is described as being set or re-set when tube 9 is conductive and as being tripped when tube 10 is conductive.

Electromechanical relays can be inserted in the anode circuit of either or both tubes, such relays being actuated by the flow of anode current.

Variations in the circuit of Fig. 1 make it adaptable for use in connection with other circuits, as shown in the subsequent figures. In Fig. 2, multi-grid tubes 39 and 40 are shown with their cathodes 41 and 42 connected to ground, with grid 43 of tube 39 grounded through grid leak 44 and connected to terminal 45 through capacitance 46, and with grid 47 of tube 40 grounded through grid leak 48 and connected to terminal 49 through capacitance 50. Screen grids 51 and 52 of tubes 39 and 40 respectively, are connected to the same positive terminal 53 of a screen grid supply source, while grids 54 and 55 are shown connected to the cathodes of their respective tubes. Grid 56 of tube 39 is connected to the negative terminal 57 of a grid supply source through grid resistance 58 and is also connected to plate 60 of tube 40 through a circuit comprising resistance 60' and a capacitance 61' in parallel. Grid 61 of tube 40 is connected to terminal 57 through grid resistance 62 and is further connected to anode 63 of tube 39 through a circuit comprising resistance 64 and capacitance 65 in parallel. Both anodes 60 and 63 connect to the same positive terminal 66 of an anode supply source, anode 60 through anode resistance 67, and anode 63 through resistance 68. Electronic tubes 69 and 70 are amplifier tubes of any type having at least one anode, a grid and a cathode. Grid 71 of tube 69 is connected to grid 56 of tube 39 through coupling resistance 72 and to input terminal 73 through capacitance 74. Grid 75 of tube 70 is connected to the grid 61 of tube 40 through coupling resistance 76 and to input terminal 77 through capacitance 78. Cathode 79 of tube 69 and cathode 80 of tube 70 are both connected to ground, either directly or through a suitable resistance (not shown). Anodes or plates 81 and 82 of tubes 69 and 70 respectively, are connected to the positive terminal 83 of a direct potential plate supply source, anode 81 through plate impedance 84 and anode 82 through plate impedance 85. Anode 81 is connected to output terminal 86 through capacitance 87 while anode 82 connects to output terminal 88 through capacitance 89. The negative terminals of the supply sources connected to terminals 53, 66 and 83 are all connected to ground, while the positive terminal of the grid supply source connected to terminal 57 is likewise grounded. As in Fig. 1, the same source may be utilized to energize terminals 53, 57, 66 and 83, provided proper polarities are observed and proper potentials utilized.

The circuit of Fig. 2 operates as follows: When the supply potentials are applied to terminals 53, 57, 66 and 83, the circuit including tubes 39 and 40 will assume one of the stable conditions described in Fig. 1, that is, with one tube conductive and with no anode current flowing in the other. Suppose in the particular stable condition assumed by the circuit, tube 39 is conductive. A negative pulse then applied to grid 43 of tube 39 through capacitance 46 will produce a reversal or change-over, in the manner described in the explanation of Fig. 1, and tube 40 will now be conductive with tube 39 non-conductive. Additional negative pulses applied to grid 43 will produce no effect on the plate current of either tube, nor will positive pulses applied to this grid be able to cause a flow of plate current in tube 39. To cause a reversal or change-over it will now be necessary to apply a negative pulse to grid 47 of tube 40 through capacitance 50. Thus, the reversal is obtained by applying a negative pulse to grid 43 or 47, as the case may be, of the particular tube which may be conductive at the time.

Grid 71 of tube 69 has the same potential with respect to its cathode 79, and hence with respect to ground, as has grid 56 of tube 39. Also, grid 75 of tube 70 has the same potential with respect to its cathode 80 and hence with respect to ground, as grid 61 of tube 40. This being so, when tube 39 is conductive and tube 40 non-conductive, one of the two stable states of the circuit, the potential of grid 56 of tube 39 and of grid 71 of tube 69 is approximately zero and tube 69 will amplify voltages applied to grid 71 through capacitance 74, such amplified voltage appearing at terminal 86. At the same time, the potential of grid 61 of tube 40 and also of grid 75 of tube 70 being negative with respect to its cathode, no plate current will flow in tube 70 and no output voltage will appear at terminal 88 when voltages are applied to grid 75 through capacitance 78. If a negative pulse is applied to grid 43 of tube 39, a reversal of the conductive state of tubes 39 and 40 will occur as previously described, and tube 39 now becomes non-conductive with tube 40 conductive. When this occurs, tube 69 will block voltages applied to its grid 71 while tube 70 will amplify voltages applied to grid 75, the amplified output of tube 70 appearing at terminal 88. If then a negative pulse be applied to grid 47 of tube 40, such will cause a reversal of the conductive state of tubes 39 and 40 and a consequent reversal in the amplifying state of tubes 69 and 70. This process of switching the amplifier tubes from an amplifying to a non-amplifying state, and vice versa, may be continued by applying negative pulse alternately to grids 43 and 47. Through the connections including resistances 72 and 76, amplifier tubes 69 and 70 are thus so coupled to tubes 39 and 40, respectively, as to be controlled thereby.

In Fig. 3, in which the trigger circuits, amplifier switching circuits and amplifier circuits are combined in a single pair of tubes 90 and 91, which are preferably of the type known as the 6A8, but other pentagrid of pentode tubes will operate successfully in the circuit shown. In this figure, grids 92 and 93 are connected to a common terminal 94 to which the negative terminal of a grid supply source is applied, grid 92 through grid resistance 95 and grid 93 through grid resistance 96. Grid 92 is also connected to terminal 97 through capacitance 98 while grid 93 is connected to terminal 99 through capacitance 100. Grid 101 of tube 90 is connected to screen grid 102 of this same tube and both grids 101 and 102 are connected to grid 93 of tube 91 through a circuit comprising capacitance 103 and resistance 104 in parallel. Grids 101 and 102 are further connected to terminal 105 through screen grid resistance 106. The positive terminal of a common anode and screen grid supply source is applied to terminal 105. Anode 107 of tube 90 is connected to terminal 105 through anode resistance 108 and also to output terminal 109 through capacitance 110. Grid 111 is connected to ground through grid leak 112 and is also connected to input terminal 113 through capacitance 114. Grid 115 and screen grid 116 of tube 91 are both connected to terminal 105 through screen grid resistance 117 and are also connected to grid 92 of the other tube 90 through a circuit comprising capacitance 118 and resistance 119 in parallel. Anode 120 connects to terminal 105 through anode resistance 121 and to output terminal 122 through capacitance 123. Grid 124 is connected to ground through grid leak 125 and is also connected to input terminal 126 through capacitance 127. Both cathodes, 128 of tube 90 and 129 of tube 91, are grounded. In this circuit, the coupling between tubes, which is necessary for the reversal of conductivity of the tubes responsive to triggering pulses, is between grid 92 of tube 90 and grids 115 and 116 of tube 91, and also between grid 93 of tube 91 and grids 101 and 102 of tube 90. A grid supply source is connected between terminal 94 and ground, the negative terminal of such grid supply source being connected to terminal 94. If desired, all the above supply potentials may be supplied from a single source.

In operation, anode and screen current will begin to flow first in one tube, say tube 90, when the supply voltages are applied, the flow of current to grid 101 and screen grid 102 through resistance 106 causing a voltage drop in resistance 106 and a reduction in the positive potential applied to grid 101 and screen grid 102. This same positive potential is likewise applied to grid 93 of the opposite tube 91 through resistance 104. A negative potential is also applied to grid 93 from terminal 94 through resistance 96 of such value that when tube 90 is not conductive, and hence with no current flow to grid 101 and screen grid 102 and no voltage drop in resistance 106, the resultant potential of grid 93 is approximately zero. Thus, when grid 101 and screen grid 102 draw current with consequent reduction in the positive potential applied to grid 93, grid 93 becomes negative and tube 91 remains non-conductive, with neither of its anode 120 nor its grid 115 nor screen grid 116 drawing current. With no current flow through resistance 117, the positive potential applied to grid 92 of tube 90 through resistance 119 is of such value that the resultant potential of grid 92 is approximately zero, and tube 90 will remain conductive.

If now, a negative pulse be applied to terminal 97, and hence to grid 92 of tube 90 through capacitance 98, the current flow to grid 101 and screen grid 102 will decrease, and the positive potential applied to these grids and also to grid 93 of tube 91 will increase sufficiently that grid 115 and screen grid 116 of tube 91 will begin to draw current. Such will cause a decrease in the positive potential applied to grids 115 and 116 due to the voltage drop in resistance 117, the resultant voltage of grid 92 of tube 90 will become negative, the current drawn by grid 101 and screen grid 102 will be further decreased, until tube 90 reaches a stable non-conductive state with tube 91 conductive. If now a negative pulse be applied to grid 93 of tube 91, such will cause a reversal in the conductive state of the tubes in a similar manner.

Similarly, with tube 90 non-conductive, and tube 91 conductive, a positive pulse applied to grid 92 through capacitance 98 will cause a reversal, due to the great controlling effect of grid 92 on the current drawn by screen grid 102 and grid 101. This positive pulse will cause grid 101 and screen grid 102 to draw current, which current flowing through resistance 106 causes a reduction in the positive potential applied to grid 93 of tube 91, such that the resultant potential of grid 93 will be negative. This in turn will cause a reduction in the current to grids 115 and 116, a reduced potential drop in resistance 117 and an increase in the positive potential applied to grid 92, such that tube 90 will then become conductive and tube 91 non-conductive. In a like manner, if tube 90 is conductive and tube 91 non-conductive, a positive pulse applied to grid 93 of tube 91 through capacitance 100 will produce a reversal or change-over in the conductive state of the tubes. When tube 90 is conductive, voltages applied to terminal 113 and hence to grid 111 through capacitance 114 will be amplified by this tube, the amplified output voltage appearing at terminal 109. When tube 90 is non-conductive, voltage applied to terminal 113 will produce no output at terminal 109. Similarly, when tube 91 is conductive, it will amplify voltages applied to terminal 126 and hence to grid 124 through capacitance 127, the amplified output voltage appears at terminal 122; when tube 91 is non-conductive, it will block voltages applied to terminal 126.

By connecting together terminals 113 and 126 (Fig. 3) or terminals 73 and 77 (Fig. 2), the circuit of either Fig. 2 or Fig. 3 can be used to switch a single alternating voltage applied to such interconnected terminals alternately to two terminals. Or, by connecting together terminals 86 and 88 (Fig. 2) or terminals 109 and 122 (Fig. 3), the circuit of either Fig. 2 or Fig. 3 can be used to switch two independent alternating voltages alternately to a common terminal.

Fig. 4 shows the relation between the voltage applied to the triggering grid and the resulting plate voltage of one relay tube of a circuit such as that shown in Fig. 1, plotted as a function of time. The plate voltage of the other relay tube is 180° out of phase with the plate voltage shown in Fig. 4. This figure shows how a short pulse applied to the grid of the tripping tubes will produce a square wave output in the plate circuit, at one-half the frequency.

The curve of Fig. 5 is plotted with anode supply terminal voltage as abscissae and with grid supply terminal voltage as ordinates, and shows a typical working area for the type of circuit described, the screen grid supply terminal voltage remaining constant. Points within the closed curve give voltage conditions under which the circuit will operate, points on the curve give voltages at which the circuit begins to fail and points outside the curve show voltage conditions under which the circuit is inoperative. It is apparent that the area within the curve is a measure of how critical the circuit is to variations of anode and bias supply voltages.

The circuits of Figs. 1 and 2 are different from other known trigger circuits in that a multi-grid tube is used in a trigger circuit of the so-called "scale of two" type in such a way that the trigger impulses are applied to the grid of what is in effect a triode, consisting of the cathode, control grid, and screen grid for a plate, none of whose elements are used for the coupling between tubes which is essential to set up the circuit having the two stable states which may be triggered from one to another. The resulting circuit is more satisfactory than other known circuits in that the operating range, as measured by curves such as shown in Fig. 5, is larger, thereby having a circuit less critical to voltage variations. The circuits shown and described herein are not critical to the wave form of the input voltage.

The following specific values of constants have been found suitable for the circuit of Fig. 1. Corresponding values will be found satisfactory in the other circuits shown. It is to be emphasized that I do not limit myself to the specific values of constants but merely include them herein as some suggested values which have been found to be satisfactory.

In Fig. 1, resistances 33 and 34 may be about 50,000 ohms; resistances 23, 26, 28 and 30 may be about 250,000 ohms; resistance 15 may be from 10,000 to 250,000 ohms; capacitances 27 and 31 may be from 10 to 250 micromicrofarads; capacitance 17 may be small, its value depending upon the form of the input pulse. In this same figure, the voltage between terminal 32 and the tube cathodes may be from 100 to 150 volts, the voltage between terminal 20 and the tube cathodes may be from 40 to 60 volts, the voltage between terminal 24 and the tube cathodes may be from 40 to 100 volts.

New uses for the trigger circuits described herein include: A self-locking electronic relay, using multi-grid tubes for controlling electromechanical relays connected in the anode circuits of the tubes as described under Figs. 1, 2 and 3 or for switching amplifier tubes by controlling the bias thereof (Fig. 2).

A trigger circuit using multi-grid tubes for the purpose of expanding a pulse into a square wave (illustrated graphically in Fig. 4), A trigger circuit using multi-grid tubes for the purpose of generating a square wave voltage from a sine wave source of much lower amplitude, A trigger circuit using multi-grid tubes for the purpose of frequency dividing or in electronic counter circuits, Other modifications and changes in the number and arrangement of the parts may be made by those skilled in the art without departing from the nature of the invention, within the scope of what is hereinafter claimed.

The invention described herein may be manufactured and/or used by or for the Government of the United States for government purposes without the payment of any royalties thereon or therefor.

Having thus set forth and disclosed the nature of this invention, what is claimed is:

1. In combination, a first multi-grid electron tube and a second multi-grid electron tube each having a cathode element, a first grid element, a second grid element, a screen grid element and an anode element, and two amplifier electronic tubes, each having a cathode, a grid and an anode, a common connection for said cathodes and said cathode elements, a common anode supply means and a respective anode resistance connecting said anode element to said supply means, a common screen grid supply means and means connecting each said screen grid element to said screen grid supply means, a resistance and a capacitance in parallel connecting said second grid of said second multi-grid tube to said anode element of said first multi-grid tube, a resistance and a capacitance in parallel connecting said second grid element of said first multi-grid tube to said anode element of said second multi-grid tube, whereby the potential of the anode element of each said multi-grid tube is applied to the second grid element of said other multi-grid tube, a common grid supply means and means including a respective grid resistance connecting each said second grid element to said grid supply means, said multi-grid tubes being alternately conductive, whereby a negative pulse applied to the first grid element of said conductive multi-grid tube reverses the conductivity state of said multi-grid tubes, a coupling resistance connecting the grid of one said amplifier tube to the second grid element of said first multi-grid tube, a coupling resistance connecting the grid of said other amplifier tube to the second grid element of said second multi-grid tube, whereby the potential of the said second grid element of each said multi-grid tube is respectively applied to the grid of said amplifier tube to which such second grid is connected, whereby each said amplifier tube is coupled to a different said multigrid tube, a common plate supply means and a separate plate impedance connecting each said anode to said plate supply means, and an input means and an output means for each said amplifier tube, whereby each said amplifier tube is in an amplifying state when the multi-grid tube to which it is coupled is in a conductive state, said amplifier tubes being in an amplifying state alternately.

2. In combination, two multi-grid electron tubes each having a cathode element, a first grid element, a second grid element, a screen grid element and an anode element; separate means for triggering each said multi-grid tube including the respective said cathode element, said first grid element and said screen grid element thereof;

means for coupling said multi-grid tubes including said second grid elements and said anode elements, supply means for energizing elements including a means for increasing the potential drop to said anode elements, whereby said multi-grid tubes are alternately made conductive, a negative pulse applied to the first grid element of each said multi-grid tube when conductive reversing the conductivity state of said multi-grid tubes, two amplifier tubes each having a cathode, a grid and an anode, means directly connecting and coupling the grid of each said amplifier tube to a separate second grid element, whereby each said amplifier tube is coupled to a different said multi-grid tube, a plate supply means and a respective plate impedance connecting each anode to said plate supply means, an input means and an output means for each said amplifier tube, each said grid having applied thereto the voltage of the second grid element to which connected, each said amplifier tube being in an amplifying state when the multi-grid tube to which it is coupled is in a conductive state.

3. In combination, an electronic relay means including two multi-grid electron tubes operative to have two stable states said multi-grid tubes responsive to negative pulses for reversing the conductivity state of said tubes, an amplifying means including two other electron tubes and means controlling said amplifying means comprising a control grid in each of said other electron tubes, and means directly connecting and coupling each of said control grids to a grid of a respective one of said multi-grid electron tubes.

4. In combination, an electronic relay means including two multi-grid electron tubes operative to have two stable states said multi-grid tubes responsive to negative pulses for reversing the conductivity state of said tubes, said multi-grid tubes being alternately conductive, and amplifying means including two other electron tubes, means establishing control of each of said other tubes by a separate one of said multi-grid tubes, said means comprising a control grid in each of said other tubes and means directly connecting and coupling each of said control grids to a grid of a respective one of said multi-grid tubes, whereby each of said other tubes will be in an amplifying state when the multi-grid tube controlling it is in a conductive state.

5. In combination, an electronic relay means including two multi-grid electron tubes operative to have two stable states said multi-grid tubes responsive to negative pulses for reversing the conductivity state of said tubes, an amplifying means including two other electron tubes, and an input means and an output means for each said amplifying means, and means coupling each of said input means to a respective one of said multi-grid tubes, thereby establishing control of a said amplifying means by said relay means.

6. In combination, an electronic relay means including two multi-grid electron tubes operative to have two stable states said multi-grid tubes responsive to negative pulses for reversing the conductivity state of said tubes, said multi-grid tubes being alternately conductive, amplifying means including two other electron tubes, each said other tube being controlled by a separate said multi-grid tube, each said amplifying means being in an amplifying state when the multi-grid tube controlling it is in a conductive state, and an input means and an output means for each said amplifying means, each of said input means being directly connected and coupled to a grid of one of said multi-grid tubes to provide said control.

7. In combination, two multi-grid tubes each having a cathode, a first grid, a second grid, a screen grid and an anode, a common connection for said cathodes, a common grid supply means and means including a respective grid resistance connecting each said first grid to said grid supply means, a resistance and a capacitance in parallel connecting the said first grid of each said tube to the said screen grid of the other said tube, a common anode and screen grid supply means, a separate resistance connecting each said screen grid and each said anode to said common supply means, separate means to apply a negative potential to said second grids, said second grid of each said tube being screened by the said screen grid thereof, separate input means connected to each said second grid, and a separate output means connected to each said anode, whereby the potential applied to the screen grid of each said tube is applied to the first grid of the other said tube, said tubes being alternately conductive, whereby a negative pulse applied to the first grid of each said tube when conductive or a positive pulse applied to the first grid of each said tube when non-conductive reverses the conductivity state of said tubes, each said tube when conductive amplifying voltages applied to the said input means thereof.

8. In combination, two multi-grid tubes each having a cathode, a first grid, a second grid, a screen grid and an anode, a common connection for said cathodes, a common grid supply means and means including a respective grid resistance connecting each said first grid to said grid supply means, a resistance and a capacitance in parallel connecting the said first grid of each said tube to the said screen grid of the other said tube, a common anode and screen grid supply means, a separate resistance connecting each said screen grid and each said anode to said common supply means, separate means to apply a negative potential to said second grids, separate input means connected to each said second grid, and a separate output means connected to each said anode, whereby the potential applied to the screen grid of each said tube is applied to the first grid of the other said tube, said tubes being alternately conductive, whereby a negative pulse applied to the first grid of each said tube when conductive or a positive pulse applied to the first grid of each said tube when non-conductive reverses the conductivity state of said tubes, each said tube when conductive amplifying voltages applied to the said input means thereof.

CLAUD E. CLEETON.

REFERENCES CITED

The following references are of record in the file of this patent:

UNITED STATES PATENTS

| Number | Name | Date |
| --- | --- | --- |
| 2,452,549 | Cleeton | Nov. 2, 1948 |

OTHER REFERENCES

Ultra-High Frequency Techniques, by Brainerd et al., line 19 on page 174 through line 2 on page 176, first published in July 1942.